(12) United States Patent
Brown et al.

(10) Patent No.: US 7,741,414 B2
(45) Date of Patent: Jun. 22, 2010

(54) ON THE FLY CATALYST TRANSITIONS

(75) Inventors: Stephen John Brown, Calgary (CA); Kenneth Edward Taylor, Sarnia (CA); Bobbi Leigh Liebrecht, Red Deer (CA)

(73) Assignee: Nova Chemicals (International) S.A. (CH)

( * ) Notice: Subject to any disclaimer, the term of this patent is extended or adjusted under 35 U.S.C. 154(b) by 809 days.

(21) Appl. No.: 11/604,053

(22) Filed: Nov. 22, 2006

(65) Prior Publication Data

US 2007/0135591 A1    Jun. 14, 2007

(30) Foreign Application Priority Data

Dec. 13, 2005   (CA)   .................................... 2529920

(51) Int. Cl.
*C08F 2/00* (2006.01)
*C08F 4/00* (2006.01)

(52) U.S. Cl. .............................. 526/65; 526/86; 526/90

(58) Field of Classification Search .................. 526/65, 526/72, 73, 86, 90, 352
See application file for complete search history.

(56) References Cited

U.S. PATENT DOCUMENTS

| 5,753,786 | A * | 5/1998 | Agapiou et al. | 526/82 |
| 7,629,422 | B2 * | 12/2009 | Goode et al. | 526/84 |
| 2003/0088037 | A1 * | 5/2003 | Stevens et al. | 526/65 |

* cited by examiner

*Primary Examiner*—David Wu
*Assistant Examiner*—Elizabeth Eng
(74) *Attorney, Agent, or Firm*—Kenneth H. Johnson

(57) ABSTRACT

A process for transitioning between Ziegler Natta (Z/N) polymerization catalysts and Second Polymerization catalysts in a polymerization system which includes at least two polymerization reactors. During the transition, the Z/N catalyst is used in the "downstream" reactor, thereby providing a flow of polymer to finishing operations. This eliminates the need for lengthy shutdowns of finishing equipment and thereby improves the efficiency of the plant operations.

2 Claims, No Drawings

ON THE FLY CATALYST TRANSITIONS

FIELD OF THE INVENTION

This invention relates to a process for transitioning between different polymerization catalysts. The process is especially suitable for transition between Ziegler Natta catalysts and well characterized organometallic catalysts (such as transition metal catalysts which contain a cyclopentadienyl ligand).

BACKGROUND OF THE INVENTION

There are many different types of polymerization catalysts which are used to produce olefin (co) polymers. The use of different catalysts allows the production of polymer products which have different physical properties.

It is often desirable to switch between different polymerization catalysts in order to respond to market demands for different polymers. However, it is not a trivial undertaking to transition between some catalysts because different catalysts are often incompatible with one another—for example, it is well known that an active Zeigler Natta catalyst may "poison" an active metallocene catalyst (i.e. severely reduce the activity of the metallocene catalyst).

Accordingly, many attempts have been made to develop technologies which facilitate catalyst transitions, including these technologies disclosed in United States Patent U.S. Pat. No. 6,949,612 (Agapiou et al.); U.S. Pat. No. 6,284,849 (Almquist et al.); and U.S. Pat. No. 6,897,269 (Schreck et al.).

In general, these prior processes require that the first polymerization catalyst be "killed" or substantially deactivated. Although these technologies do mitigate problems resulting from undesirable reactions between two incompatible catalysts, these technologies may introduce other problems such as:

(i) the need to carefully control the addition of the deactivator agent (so that it does not become a poison for the new catalyst); and (ii) the need to allow downtime for the deactivation reaction (and generally, the subsequent purging of the deactivator).

This second problem—i.e. "downtime" can cause further problems, particularly if it requires that polymer finishing operations (such as polymer degassing and pelletizing operations) be stopped and restarted. For example, the seals and/or bearings or mechanical pumps and compressors which are used in the polymer finishing operations may be more likely to fail during a shut down/start-up cycle than they would otherwise be during continuous operation.

SUMMARY OF THE INVENTION

The present invention provides an on the fly process for transitioning between a polymerization conducted with a Ziegler Natta catalyst and a polymerization conducted with a Second Catalyst, wherein said process employs at least an upstream polymerization reactor and a downstream polymerization reactor, and wherein said process is characterized by a transition step wherein said Ziegler Natta catalyst is employed in said downstream reactor and said Second Catalyst is employed in said upstream reactor.

As used herein, the term "on the fly" means that the flow from the downstream reactor to finishing operations is not discontinued during the transition process and that polymer is produced continuously from at least one reactor. Thus, the present invention allows polymers from the second (downstream) polymerization reactor to be regularly discharged to downstream finishing operation, thereby eliminating the need to shut down and start up the mechanical equipment which is used in these finishing operations.

In one embodiment, the present invention provides an on the fly transition from a Ziegler Natta catalyst to a Second Catalyst. This embodiment comprises:

(1) conducting a Ziegler Natta polymerization in said downstream reactor;

(2) initiating a polymerization reaction with said Second Catalyst in said upstream reactor;

(3) terminating said Ziegler Natta polymerization; and (4) initiating a polymerization reactor with said Second Catalyst in said downstream reactor.

In another embodiment, the present invention provides an on the fly transition from a Second Catalyst to a Ziegler Natta catalyst. This embodiment comprises:

(a) maintaining a polymerization reaction with said Second Catalyst in said upstream reactor;

(b) subsequently, initiating polymerization with said Ziegler Natta catalyst in said downstream reactor; and (c) subsequently, terminating polymerization with said Second Catalyst in said upstream reactor.

DETAILED DESCRIPTION OF THE PREFERRED EMBODIMENTS

Part A. Catalysts

This invention relates to transitions between different polymerization catalysts.

It is well known that certain pairs of different polymerization catalysts are "incompatible"—for example: one catalyst may act as a "poison" for the other; or one catalyst may have a different reactivity ratio from the other; or one catalyst may have a different "hydrogen response" in comparison to the other. Further details relating to problems caused by incompatible catalysts are set out in U.S. Pat. No. 6,949,612. In general, transition between incompatible catalysts have involved large amounts of off grade polymer production and/ or lost production time.

The present invention is not particularly restricted to the use of any specific pair of polymerization catalyst and the present invention may be useful with catalysts that have not even been invented at the filing date of this application. The present invention is generally useful with olefin polymerization catalysts, provided that one of the catalysts is a Ziegler Natta catalyst.

It has been observed that Ziegler Natta catalysts are comparatively "robust", in the sense that a "polymerizate" made with another catalyst system is less prone to completely "kill" a Z/N catalyzed reactor than vice-versa. Thus, a "polymerizate" (i.e. the raw polymer and residual catalyst from the polymerization) may be introduced into a reactor which contains a Z/N catalyzed polymerization. If this polymerizate does not completely kill the Z/N polymerization, then the catalyst which was used to prepare the polymerizate may be used as a "Second Catalyst" according to this invention (and on the fly transitions between the Z/N catalyst and the Second Catalyst may be conducted in accordance with the present invention).

Simply put: if the polymerizate from a given catalyst does not completely deactivate/kill a Z/N catalyzed polymerization, then that given catalyst is suitable for use as a "Second Catalyst" in the process of this invention.

Conversely, the addition of a polymerizate made from a Z/N catalyst has been observed to severely deactivate some other catalysts. Thus, for clarity, the present invention does not contemplate the addition of a Z/N polymerization into a reactor which contains another polymerization catalyst.

As previously noted, the present invention is particularly well suited to transition between a Ziegler Natta catalyst and a Second Catalyst which contains a cyclopentadienyl ligand, such as a metallocene catalyst or a cyclopentadienyl/heteroatom catalyst.

These Second Catalysts are generally used in combination with a catalyst or activator selected from the group consisting of hydrocarbyl aluminum activators (described above in the section relating to Z/N catalysts); aluminoxanes (especially methylaluminoxane, or MAO) or "ionic activators" (also sometimes referred to as non coordinating ions).

Aluminoxanes, particularly MAO, one well known items of commerce and one further described in the previously mentioned U.S. Pat. Nos. 5,324,800 and 5,096,867.

Similarly, ionic activators are also well known items of commerce and are also further described in U.S. Pat. Nos. 6,147,172 and 6,342,463.

Brief description of Ziegler Natta and Second Catalysts to follow.

A.1 Ziegler Natta Z/N Catalysts

The term Ziegler Natta (Z/N) catalyst is meant to describe the well known family of olefin polymerization catalysts. In general, these catalysts typically comprise of a least one group 4 or 5 transition metal "catalyst" (titanium, zirconium, hafnium or vanadium, with titanium and/or vanadium being preferred). Examples of suitable titanium catalysts follow. $TiCl_4$, $TiBr_4$, $Ti(OC_2H_5)_3Cl$, $Ti(OC_2H_5)$, $Cl_3$, $Ti(OC_4H_9)_3Cl$, $Ti(OC_3H_7)Cl_2$, and $Ti(OC_2H_5)_2Br_2$.

Non-limiting examples of conventional-type vanadium catalyst compounds include vanadyl trihalide, alkoxy halides and alkoxides such as $VOCl_3$, $VOCl_2(OBu)$ where "Bu" means "butyl" and $VO(OC_2H_5)_3$; vanadium tetra-halide and vanadium alkoxy vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR, where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, hexyl, cyclohexyl, naphthyl, etc., and vanadium acetyl acetonates.

The Z/N catalysts are generally used in combination with a hydrocarbyl aluminum activator according to the formula:

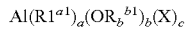

where $R^{a1}$ is a hydrocarbyl group having from 1 to 10 carbon atoms; $OR^{b1}$ is an alkoxy or aryloxy group where $OR^{b1}$ is hydrocarbyl fragments having from 1 to 10 carbon atoms and being bonded to oxygen; X is chloride or bromide and a+b+c=3, with the proviso that a is greater than 0. Examples of the hydrocarbyl aluminum activator in widespread use include trimethyl aluminum, triethyl aluminum and triisobutyl aluminum.

A.2 Second Catalysts

Brief descriptions of candidates which may be suitable as Second Catalysts are provided below.

A.2.1 Chromium Catalysts

The term "chromium catalyst" is meant to generally describe the well known form of olefin polymerization catalysts which are prepared by supporting a chromium species (such as chromium oxide or a silyl chromate) on a metal oxide support (such as a silica or aluminum).

These catalysts are commercially available and are well described in the patent literature.

A.2.3 (Well Characterized) Organometallic Catalysts

The term well characterized organometallic catalyst is meant to refer to a catalyst system which includes a transition metal compound ("TMC") of a group 3-15 transition metal with at least two well defined "functional" ligands (where the term functional ligand excludes simple linear alkyl ligands). The use of a group 4 metal (e.g. titanium or hafnium) TMC is preferred.

Examples of such catalysts include:

(1) Metallocene catalysts (which contain two "functional" cyclopentadienyl ligands; and where the term cyclopentadienyl includes substituted cyclopentadienyls such as indenyl, fluorenyl and wherein the indenyl or fluorenyl ligands may also be substituted (see for example U.S. Pat. No. 5,324,800, Welborn et al.);

(2) Monocyclopentadienyl/heteroatom catalysts (which contain a cyclopentadienyl ligand (which may be substituted) and a second ligand which contains an O, N, P or S atom that is bonded to the transition metal—examples of such ligands include phenoxy, amine, amide, phosphine, phosphinimine, ether and, ketimide—and wherein the heteroatom ligand may be bridged to the cyclopentadienyl ligand). (See U.S. Pat. No. 5,096,867, Canich and U.S. Pat. No. 6,342,463, Stephen et al.)

(3) Bis-Heteroatom Catalysts

This category includes catalysts which contain two heteroatom ligands (as discussed above). Known examples include:

3.1 Bisphosphinimine (U.S. Pat. No. 6,649,558, Stephen et al.);

3.2 Phosphinimine/Phenoxy; Phosphinimine/Imine; Bisphosphinimine/Amine (U.S. Pat. No. 6,147,172, Brown et al.);

3.3 Amide/Ether; and 3.4 Phenoxy/Imine

The use of routine, non-inventive experiments may be used to determine whether a given catalyst is suitable for use as a Second Catalyst in the present invention. These experiments are conducted by adding a potential Second Catalyst (in an amount which is sufficient to support olefin polymerization) to a Z/N catalyzed olefin polymerization. A given catalyst is suitable for use as a Second Catalyst if it does not completely deactivate the Z/N polymerization.

Part B Process Technologies and Reactor Configurations

In general, this process may be employed with any process technology (such as gas phase, slurry or solution—explained in more detail below), provided that the process uses at least two reactors which are connected "in series" (explained below).

B.1 Polymerization Processes

This invention is suitable for use in any conventional olefin polymerization process, such as the so-called "gas phase", "slurry", "high pressure" or "solution" polymerization processes. Polyethylene, polypropylene and ethylene propylene elastomers are examples of olefin polymers which may be produced according to this invention.

The preferred polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to about 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts of up to 10 weight % of the polymer although typically is present in amounts from about 3 to 5 weight %. The resulting polymer may have a composition comprising from 40 to 75 weight % of ethylene, from 50 to 15 weight % propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention might also be useful to prepare polyethylene having a density below 0.910 g/cc—the so-called very low and ultra low density polyethylenes.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

A general, a fluidized bed gas phase polymerization reactor employs a "bed" of polymer and catalyst which is fluidized by a flow of monomer which is at least partially gaseous. Heat is generated by the enthalpy of polymerization of the monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and amount of such condensed fluid preferably does not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the polymerization process of this invention.

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.). Polymerization temperatures may range from about 30° C. to about 280° C. (with lower temperatures being preferred for elastomers and higher temperatures being preferred for high density polyethylene).

The preferred solution polymerization process uses at least two polymerization reactors. The polymer solution exiting from the first reactor is transferred to the second polymerization (i.e. the reactors are arranged "in series" so that polymerization in the second reactor occurs in the presence of the polymer solution from the first reactor).

The polymerization temperature in the first reactor is preferably from about 80° C. to about 180° C. (preferably from about 120° C. to 160° C.) and the second reactor is preferably operated at a higher temperature. Cold feed (i.e. chilled solvent and/or monomer) may be added to both reactors or to the first reactor only. The polymerization enthalpy heats the reactor. The polymerization solution which exits the reactor may be more than 100° C. hotter than the reactor feed temperature. The polymerization reactor(s) are preferably "stirred reactors" (i.e. the reactors are extremely well mixed with a good agitation system). Agitation efficiency may be determined by measuring the reactor temperature at several different points. The largest temperature difference (i.e. between the hottest and coldest temperature measurements) is described as the internal temperature gradient for the polymerization reactor. A very well mixed polymerization reactor has a maximum internal temperature gradient of less than 10° C. A particularly preferred agitator system is described in co-pending and commonly assigned U.S. Pat. No. 6,024,483. Preferred pressures are from about 500 psi to 8,000 psi. The most preferred reaction process is a "medium pressure process", which means that the pressure in each reactor is preferably less than about 6,000 psi (about 42,000 kiloPascals or kPa), and most preferably from about 1,500 psi to 3,000 psi (about 14,000-22,000 kPa).

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. Octene-1 is highly preferred.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing may be desirable to provide a reaction time for the catalyst components prior to entering the reaction. Such an "in line mixing" technique is described the patent literature (most notably U.S. Pat. No. 5,589,555, issued Dec. 31, 1996 to DuPont Canada Inc.).

The residence time in each reactor will depend on the design and the capacity of the reactor. Generally the reactors should be operated under conditions to achieve a thorough mixing of the reactants. In addition, it is preferred that from 20 to 60 weight % of the final polymer is polymerized in the first reactor, with the balance being polymerized in the second reactor.

B.2 Reactor Configurations

As previously noted, the present process requires the use of two reactors which are connected "in series"—i.e. the polymerization product which is polymerized in the "upstream reactor" is passed into the "downstream reactor".

The product from the downstream reactor is then discharged to the "finishing operations" which are used to convert the crude polymerization product into a saleable polyolefin product. These finishing operations typically include the removal of residual monomers from the plastic (and solvent in the case of a solution process or diluent, in the case of a slurry process); the optional addition of additives such as antioxidants, light stabilizers; pigments, slip; antiblock, additives and processing aids such as fluoropolymers or polyethers); and an optional "pelletizing" steps to convert the crude plastic into pellet form.

It will be appreciated by those skilled in the art that these "finishing operations" generally require the operation of a variety of mechanical equipment (such as pumps and compressors) which contain seals and bearings. These seals and bearings are generally more prone to failure during a shut down/start up cycle than they would be during an equivalent time span of continuous operation. Thus, it is desirable to avoid prolonged shut downs of the finishing operations, and the present invention may be employed to realize this advantage.

Both of the "upstream" reactor and "downstream" reactor must be equipped with independent catalyst addition facilities and independent monomer facilities in order to utilize the present invention (as will become apparent during the following detailed description of preferred transition protocols).

Transition from Z/N to Second Catalyst

The first part of the transition procedure relates to establishing a polymerization reaction in a "downstream" reactor with the Ziegler Natta ("Z/N") catalyst. Crude polymer product which is being produced with the Z/N catalyst system is being discharged to the finishing operations at this time.

This part of the process occurs during normal plant operation—in other words, the reactor is being operated in a manner which is typically used to produce polyolefins.

The "upstream" reactor may also be in "typical" use as this time, with polymerization product (made with the Z/N catalyst) being discharged into the downstream reactor. If the upstream reactor is in use, the first step is to shut off the catalyst flow to the "upstream" reactor and preferably, at about the same time, shut down or reduce the flow of monomer to the first reactor.

The second step of the process is to introduce the "Second" polymerization catalyst into the upstream reactor, together with the addition of monomer to the upstream reactor. This will establish polymerization conditions with the "Second" catalyst in the upstream reactor. Polymerization product from the upstream reactor is then discharged into the "downstream" reactor.

The Z/N polymerization in the second reactor is then shut down. It is preferred to do this by quickly ramping down catalyst flows to the second reactor because this action will minimize the amount of "transition off-grade" (which would be made to the second reactor when continued for an extended period of time).

The third step of the process is to introduce the "Second" catalyst into the downstream reactor.

This step is "comparatively easy" because the catalyst being added is the same as the catalyst which comes into the reactor from the discharge of the upstream reactor. However, the act of re-establishing polymerization conditions in the downstream reactor will also add to the heat load in the second reactor (due to the enthalpy of polymerization).

In the case of solution polymerizations, the extra heat load which results from this "new" polymerization downstream will generally cause a reduction in the molecular weight of the polyolefin being produced. Similarly, the polymer which is initially produced in the upstream reactor with the Second Catalyst will have a comparatively high molecular weight. Accordingly, it is preferred to use comparatively high concentrations of chain transfer agents (such as hydrogen or aluminum alkyl) in the upstream reactor during the initial phase of the second step of the present process.

In addition (or as an alternative) the upstream reactor temperature may initially be set at a higher operating point in order to reduce the molecular weight of the polymer which is initially produced in the upstream reactor. Then, as polymerization is re-established in the downstream reactor with the Second Catalyst, the "reverse" control procedure is used—i.e. lowering the temperature in the upstream reactor and/or reducing the concentration of the chain transfer agent].

Transition from "Second" Catalyst to Ziegler Natta Catalyst

Prior to this transition, both of the upstream and down stream reactors are operating with a "Second" polymerization catalyst (which is preferably a metallocene catalyst or a cyclopentadienyl/heteroatom catalyst).

The first step of this transition is to stop the polymerization in the downstream reactor. Polymerization is continued in the upstream reactor, thereby providing a flow of polymerizate from the reactor to the downstream reactor (and out of the second reactor into the finishing operations).

The second step is to initiate a polymerization reaction in the downstream reactor with the Ziegler Natta catalyst. This step is undertaken with polymerizate from the upstream reactor flowing into the downstream reactor.

The third step is to terminate the polymerization in the upstream reactor (preferably by ramping down the flow of the Second Catalyst and ramping down the monomer flow to the upstream reactor).

The above described process steps have been generally described in terms of an upstream reactor and a downstream reactor. It is preferred that both reactors are operated using the same "process technology" (i.e. upstream solution reaction/downstream solution reactor; upstream gas phase reactor/downstream gas phase reactor; upstream slurry reactor/downstream slurry reactor).

It is also preferred to conduct the on the fly transitions during homopolymerizations of ethylene.

The invention will now be described in further detail by way of the following non-limiting examples.

EXAMPLES

Example 1

Selection of "Second" Catalyst

A Z/N catalyst system consisting of titanium tetrachloride, magnesium dichloride (prepared by reacting butyl ethyl magnesium with tertiary butyl chloride) and two hydrocarbyl aluminum compounds (namely triethyl aluminum and diethyl aluminum ethoxide) was used in these experiments.

"Second" catalysts candidates comprising a transition metal compound (TMC) and activators were also investigated. The TMC was (cyclopentadienyl) (tritertiary butyl phosphinimine) titanium dichloride and the activators were Methyl aluminoxane (MAO) and "trityl borate" (i.e. [$Ph_3C$] [$B(C_6F_5)_4$], where Ph is phenyl), used in conjunction with a hindered phenolic compound.

Example 1.1

Small scale ethylene polymerization (optionally with comonomer) where conducted with "Second Catalysts". The Z/N catalyst was then added to these polymerizations in an amount which would typically have been suitable to initiate ethylene polymerization. The Z/N catalyst was consistently observed to "kill" these polymerizations—i.e. the Z/N catalyst consistently deactivated the polymerizations with the "Second" catalyst. In particular, butyl ethyl magnesium and tertiary butyl chloride were observed to be severe poisons for this Second Catalyst.

Example 1.2

Conversely, the Z/N catalyst was observed to be quite robust when subjected to the "Second" catalyst. These experiments were conducted by 1) initiating ethylene (co) polymerization with the Z/N catalyst, then 2) adding the "Second" catalyst to the polymerization (where the Second Catalyst was added in an amount that was sufficient to initiate polymerization) in the presence of the Z/N catalyst.

The experiments conducted in Example 1.2 confirm the selection of a suitable "Second Catalyst"—i.e. a catalyst which does not completely deactivate the Z/N catalyst when the Second Catalyst is added to a Z/N catalyzed polymerization.

The experiments conducted in Example 1.1 serve to confirm why the present transition process must always be conducted with the Z/N catalyst in the downstream reactor.

Example 2

This example illustrates an "on the fly" transition from a "Second Catalyst" to a Z/N where both catalysts, are as described in Example 1).

An ethylene homopolymerization was initially being conducted in a dual reactor solution polymerization process with the Second Catalyst. Thus, ethylene and Second Catalyst were all being added to both polymerization reactors. The polymerizate (i.e. the raw polymer, together with catalyst residues) from the upstream reactor was discharged to the downstream reactor and polymer was discharged to the finishing operations.

Under these dual reactor conditions, the polymer which was being produced in the upstream reactor had a comparatively high molecular weight and the polymer being produced in the downstream reactor lead a comparatively low molecular weight. It will be appreciated by those skilled in the art that very high molecular weight polyethylene is often difficult to finish. Accordingly, one concern with the first steps of the transition (in which the downstream reactor is shut down) is that the finishing operations might be destabilized/upset by a sudden increase in the molecular weight of the polymer being discharged to finishing.

Therefore, control action was taken to decrease the molecular weight of the polyethylene being produced in the upstream reactor. This involved (a) increasing the flow of the hydrogen; and (b) increasing the reaction temperature.

The polymerization in the downstream reactor was then terminated by shutting off the flow of ethylene and Second Catalyst to the downstream reactor. Polymerizate from the first reactor continued to flow through the Second reactor and on to finishing.

The Z/N catalyst was then added to the Second reactor. Some care was taken to ensure that the concentrations of the Z/N catalyst in the downstream reactor were sufficient to support polymerization before the ethylene was added. Initiation of polymerization by the Z/N catalyst was observed by monitoring the temperature of the reactor (i.e. the "new" polymerization with the Z/N catalyst is exothermic and the resulting addition of the enthalpy/heat to the downstream reactor was used to confirm the successful initiation of polymerization with the Z/N catalyst).

Polymerization in the upstream reactor was then terminated by ramping down the flows of ethylene and Second Catalyst.

What is claimed is:

1. An on the fly process for transitioning between a polymerization conducted with a Ziegler Natta catalyst and a polymerization conducted with a Second Catalyst, wherein said process employs at least an upstream polymerization reactor and a downstream polymerization reactor, and wherein said process is characterized by a transition step wherein said Ziegler Natta catalyst is employed in said downstream reactor and said Second Catalyst is employed in said upstream reactor, said process comprising:

(1) conducting a Ziegler Natta polymerization in said downstream reactor;
    (2) initiating a polymerization reaction with said Second Catalyst in said upstream reactor;
    (3) terminating said Ziegler Natta polymerization; and
    (4) initiating a polymerization reaction with said Second Catalyst in said downstream reactor, with the proviso that said transition is from said Zeigler Natta catalyst to said second catalyst.

2. The process of claim 1 wherein at least one of said polymerization is an ethylene homopolymerization.

* * * * *